US011051179B2

(12) United States Patent
Chang

(10) Patent No.: US 11,051,179 B2
(45) Date of Patent: Jun. 29, 2021

(54) DEVICE INCLUDING ANTENNA AND CONTROL METHOD THEREOF

(71) Applicant: Samsung Electronics Co., Ltd., Suwon-si (KR)

(72) Inventor: Sanghyun Chang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/822,004

(22) Filed: Nov. 24, 2017

(65) Prior Publication Data
US 2018/0152852 A1 May 31, 2018

(30) Foreign Application Priority Data
Nov. 25, 2016 (KR) .......... 10-2016-0158724

(51) Int. Cl.
H04W 16/28 (2009.01)
H04B 17/318 (2015.01)
(Continued)

(52) U.S. Cl.
CPC ............ H04W 16/28 (2013.01); G01S 3/20 (2013.01); G01S 3/22 (2013.01); G01S 3/38 (2013.01);
(Continued)

(58) Field of Classification Search
CPC ........ G01S 3/38; H04B 17/318; H04W 16/28; H04W 24/10; H04W 72/044; H04W 72/085; H04W 88/02; H04W 88/08
See application file for complete search history.

(56) References Cited

U.S. PATENT DOCUMENTS 6,333,936 B1* 12/2001 Johansson ............... H04J 13/16
370/449
2007/0103377 A1* 5/2007 Abramov ............... H01Q 25/00
343/818
(Continued)

FOREIGN PATENT DOCUMENTS

EP 2104245 A1 9/2009
EP 2110965 A1 10/2009
(Continued)

OTHER PUBLICATIONS

International Search Report dated Feb. 13, 2018, issued in International Application No. PCT/KR2017/013500.
(Continued)

Primary Examiner — Gregory B Sefcheck
Assistant Examiner — Debebe A Asefa
(74) Attorney, Agent, or Firm — Jefferson IP Law, LLP

(57) ABSTRACT

A device including an antenna and a control method thereof are provided. In the method, a base station receives, from at least one terminal, a reference signal transmitted through at least one beam based on beam sweeping. Also, the base station calculates an angle between the base station and the at least one terminal transmitting the reference signal by using the received reference signal for each beam, and computes an optimal antenna orientation of a base station antenna of the base station by using the calculated angle. Further, the base station adjusts an orientation of the base station antenna according to the optimal antenna orientation of the base station antenna.

20 Claims, 9 Drawing Sheets

(51) Int. Cl.

| | | |
|---|---|---|
| *H04L 5/00* | (2006.01) | |
| *H04W 24/10* | (2009.01) | |
| *H04W 72/04* | (2009.01) | |
| *H04W 72/08* | (2009.01) | |
| *G01S 3/38* | (2006.01) | |
| *H01Q 3/26* | (2006.01) | |
| *H04W 88/02* | (2009.01) | |
| *H04W 88/08* | (2009.01) | |
| *H01Q 1/24* | (2006.01) | |
| *G01S 3/22* | (2006.01) | |
| *H01Q 3/02* | (2006.01) | |
| *G01S 5/12* | (2006.01) | |
| *H04B 7/0404* | (2017.01) | |
| *H04B 7/06* | (2006.01) | |
| *G01S 3/20* | (2006.01) | |
| *H04W 8/24* | (2009.01) | |

(52) U.S. Cl.
CPC ............. *G01S 5/12* (2013.01); *H01Q 3/02* (2013.01); *H01Q 3/2605* (2013.01); *H04B 7/0404* (2013.01); *H04B 7/0695* (2013.01); *H04B 17/318* (2015.01); *H04L 5/0023* (2013.01); *H04L 5/0048* (2013.01); *H04L 5/0051* (2013.01); *H04W 8/24* (2013.01); *H04W 24/10* (2013.01); *H04W 72/044* (2013.01); *H04W 72/085* (2013.01); *H01Q 1/246* (2013.01); *H04W 88/02* (2013.01); *H04W 88/08* (2013.01)

(56) References Cited

U.S. PATENT DOCUMENTS

| | | | |
|---|---|---|---|
| 2008/0193115 A1* | 8/2008 | Uenishi | H04N 5/232127 396/123 |
| 2008/0252885 A1* | 10/2008 | Blalock | G01K 1/026 356/328 |
| 2009/0262035 A1 | 10/2009 | Gonikberg | |
| 2010/0014463 A1 | 1/2010 | Nagai et al. | |
| 2011/0053647 A1 | 3/2011 | Oyama | |
| 2011/0103504 A1 | 5/2011 | Ma | |
| 2013/0331140 A1 | 12/2013 | Halbauer et al. | |
| 2015/0011198 A1 | 1/2015 | Wellington | |
| 2015/0380816 A1 | 12/2015 | Tajika et al. | |
| 2016/0205501 A1 | 7/2016 | Lee et al. | |
| 2018/0115958 A1* | 4/2018 | Raghavan | H04B 7/0834 |
| 2019/0104549 A1* | 4/2019 | Deng | H04B 7/0617 |

FOREIGN PATENT DOCUMENTS

| | | |
|---|---|---|
| EP | 2897304 A1 | 7/2015 |
| KR | 10-2015-0026090 A | 3/2015 |
| WO | 2015/030520 A1 | 3/2015 |

OTHER PUBLICATIONS

Extended European Search Report dated Oct. 11, 2019, issued in a counterpart European application No. 17872956.2-1220 / 3510708.

\* cited by examiner

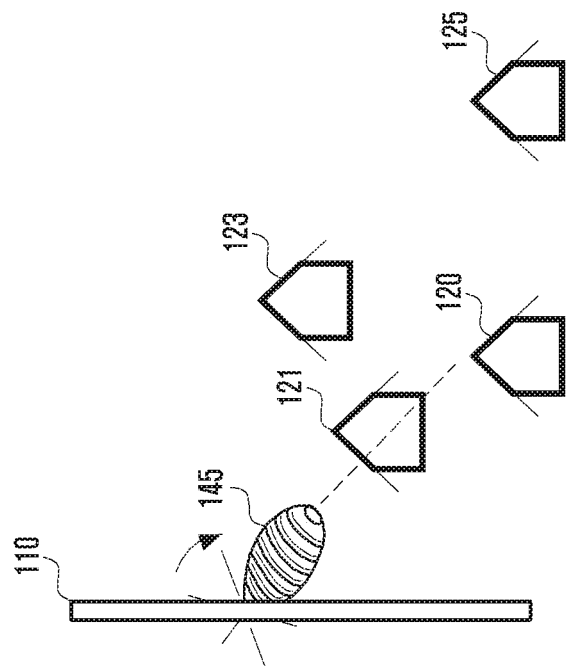
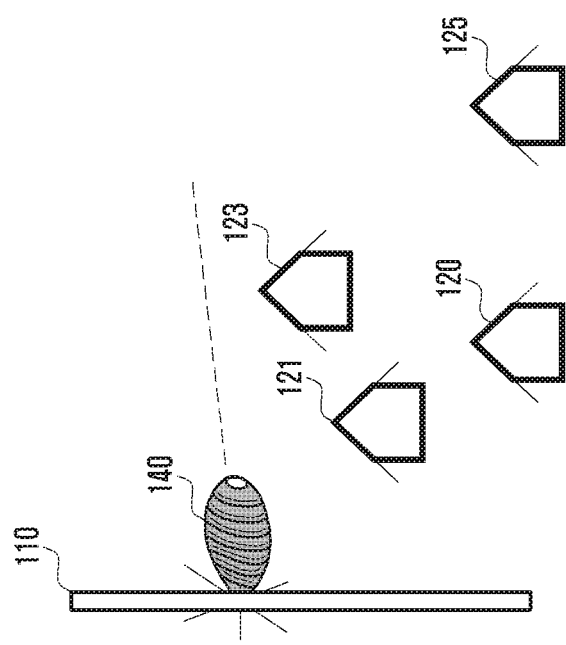

DEVICE INCLUDING ANTENNA AND CONTROL METHOD THEREOF

CROSS-REFERENCE TO RELATED APPLICATION(S)

This application claims the benefit under 35 U.S.C. § 119(a) of a Korean patent application filed on Nov. 25, 2016 in the Korean Intellectual Property Office and assigned Serial number 10-2016-0158724, the entire disclosure of which is hereby incorporated by reference.

TECHNICAL FIELD

The present disclosure relates to a device including an antenna and a control method thereof. More particularly, the present disclosure relates to a device and method for dynamically adjusting an antenna orientation.

BACKGROUND

To meet increasing demands for wireless data traffic after commercialization of the fourth generation (4G) communication system, efforts have been made to develop an improved fifth generation (5G) or pre-5G communication system. Therefore, the 5G or pre-5G communication system is also called a beyond 4G network communication system or a post long term evolution (LTE) system.

The 5G communication system is considered for implementation in an ultrahigh frequency (mmWave) band, e.g., 60 GHz band, so as to accomplish higher data rates. To decrease propagation loss of radio waves and increase a transmission distance of radio waves in the ultrahigh frequency band, various techniques such as beamforming, massive multiple-input multiple-output (MIMO), full dimensional MIMO (FD-MIMO), array antenna, analog beamforming, and large scale antenna techniques are being discussed in the 5G communication system.

Meanwhile, when an antenna of the ultrahigh frequency (mmWave) band is used, an angle and direction between a signal radiated from the antenna of the base station and the terminal receiving this signal, or an angle and direction between a signal radiated from the terminal and the antenna of the base station receiving this signal may have a significant impact on signal quality. For example, as the terminal is tilted in front of a signal radiated from the base station, the gain of the signal received by the terminal may be lowered. Further, in case of the ultrahigh frequency band, the gain difference of such a signal may be considerable.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for dynamically adjusting an antenna orientation of a base station by considering positions, traffic distributions, subscriber levels, quality of service (QoS) requirements, etc. of terminals located in a cell coverage of the base station.

Another aspect of the present disclosure is to provide a method for dynamically adjusting an antenna orientation of a base station by wholly considering variations of channel environment, changes in positions of terminals existing in the coverage of a base station, and a change in signal strength due to an additional base station installed around the base station.

In accordance with an aspect of the present disclosure, a communication method of a base station is provided. The method includes receiving, from at least one terminal, a reference signal transmitted through at least one beam based on beam sweeping, calculating an angle between the base station and the at least one terminal transmitting the reference signal by using the received reference signal for each beam, computing an optimal antenna orientation of a base station antenna of the base station by using the calculated angle, and adjusting an orientation of the base station antenna according to the optimal antenna orientation of the base station antenna.

Additionally, the calculating of the angle may include measuring received signal strength of the reference signal for each beam, and calculating an angle between the at least one terminal and the base station according to a beam having the greatest received signal strength of the reference signal.

Additionally, the calculating of the angle may include measuring strength of the reference signal for each beam, estimating a channel of each beam according to the strength of the reference signal for each beam, detecting a peak position in the estimated channel, selecting a line-of-sight (LoS) path from the peak position, and calculating an angle between the at least one terminal and the base station by using the LoS path and a beam pattern.

Additionally, the optimal antenna orientation of the base station antenna may be computed using at least one of the angle between the at least one terminal and the base station, a position of the at least one terminal, a traffic amount of the at least one terminal, or information about a user of the at least one terminal.

Additionally, the information about the user of the at least one terminal may include at least one of charging information for each user of the at least one terminal, information about a signal quality required by each user of the at least one terminal, or information about a subscriber level of each user of the at least one terminal.

Additionally, the computing of the optimal antenna orientation of a base station antenna may include calculating a position of the at least one terminal transmitting the reference signal by using the reference signal, and computing the optimal antenna orientation of the base station antenna by using the angle between the at least one terminal and the base station and using position information of the at least one terminal.

Additionally, the position of the at least one terminal transmitting the reference signal may be calculated based on a strength of the reference signal.

Additionally, when there is an additional base station, the optimal antenna orientation of the base station antenna may be computed using information of the additional base station, the angle between the at least one terminal and the base station, and information about a position of the at least one terminal.

In accordance with another aspect of the present disclosure, a base station is provided. The base station includes an antenna unit including at least one base station antenna and a base station antenna orientation adjuster, a transceiver configured to transmit and receive a signal, and a controller configured to receive, from at least one terminal, a reference signal transmitted through at least one beam based on beam sweeping, to calculate an angle between the base station and the at least one terminal transmitting the reference signal by using the received reference signal for each beam, to compute an optimal antenna orientation of a base station antenna of the base station by using the calculated angle, and to control the base station antenna orientation adjuster to adjust an orientation of the base station antenna according to the optimal antenna orientation of the base station antenna.

In accordance with another aspect of the present disclosure, a communication method of a terminal is provided. The method includes transmitting a reference signal to a base station through at least one beam based on beam sweeping, receiving, from the base station, information for computing an optimal antenna orientation of a terminal antenna of the terminal in response to the transmitted reference signal for each beam, and adjusting an orientation of the terminal antenna by using the received information for computing the optimal antenna orientation of the terminal antenna.

Additionally, the receiving of the information for computing the optimal antenna orientation of the terminal antenna may include receiving information about the optimal antenna orientation of the terminal antenna from the base station.

Additionally, the receiving of the information for computing the optimal antenna orientation of the terminal antenna may include receiving information about an angle between the terminal and the base station from the base station, and calculating the optimal antenna orientation of the terminal antenna by using the information about the angle between the terminal and the base station.

In accordance with another aspect of the present disclosure, a terminal is provided. The terminal includes an antenna unit including at least one terminal antenna and a terminal antenna orientation adjuster, a transceiver configured to transmit and receive a signal, and a controller configured to transmit a reference signal to a base station through at least one beam based on beam sweeping, to receive, from the base station, information for computing an optimal antenna orientation of a terminal antenna of the terminal in response to the transmitted reference signal for each beam, and to control the terminal antenna orientation adjuster to adjust an orientation of the terminal antenna by using the received information for computing the optimal antenna orientation of the terminal antenna.

Another aspect of the present disclosure is to provide a method for dynamically adjusting an antenna orientation of a base station by considering positions, traffic distributions, subscriber levels, QoS requirements, etc. of terminals located in a cell coverage of the base station is provided.

In addition, a method for dynamically adjusting an antenna orientation of a base station by wholly considering variations of channel environment, changes in positions of terminals existing in the coverage of a base station, and a change in signal strength due to an additional base station installed around the base station is provided.

The effects that may be achieved by the embodiments of the present disclosure are not limited to the above-mentioned aspects. For example, other effects that are not mentioned may be obviously understood by those skilled in the art to which the present disclosure pertains from the following description.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2A and 2B are diagrams illustrating another example of setting an antenna orientation according to an embodiment of the present disclosure;

Throughout the drawings, it should be noted that like reference numbers are used to depict the same or similar elements, features, and structures.

DETAILED DESCRIPTION

Figure 1A:
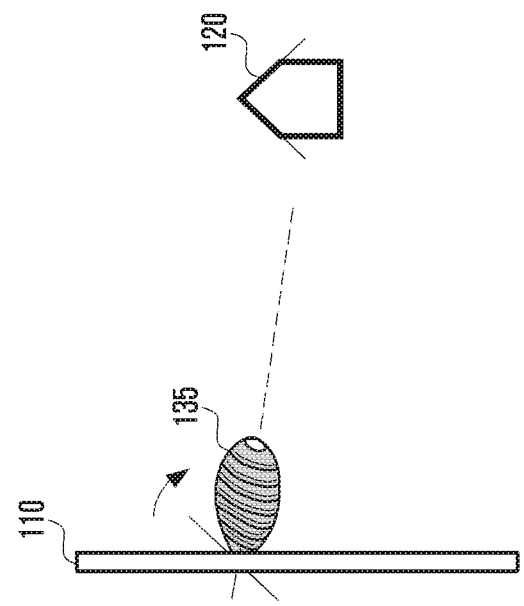
FIGS. 1A and 1B are diagrams illustrating an example of setting an antenna orientation according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

In this disclosure, when it is stated that a certain element is "coupled to" or "connected to" another element, such elements may be electrically, physically or logically coupled to or connected to each other. Also, both elements may be directly coupled or connected to each other, or a new element may exist between both elements. In addition, the terms "include", "comprise", and "have" as well as derivatives thereof, mean inclusion without limitation.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Elements shown in embodiments of this disclosure are used independently to represent different characteristic functions and do not necessarily mean that each element is composed of separate hardware or one software unit.

Namely, respective elements are used exemplarily for convenience of description, and at least two elements may be integrated into one element, or one element may be divided logically or physically into a plurality of elements to perform similar or different functions. Any case is also included within the scope of the present disclosure, without departing from the essence of the present disclosure.

Some of elements used herein may not be essential for the present disclosure, but may be optional elements only to improve performance. This disclosure may be implemented with essential elements only or by further including optional elements.

In this disclosure, terms are defined in consideration of functions of this disclosure and may be varied depending on user or operator's intention or custom. Therefore, the definition should be made based on the contents throughout this description.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a non-transitory computer usable or computer-readable memory that may direct a computer or other programmable data processing apparatus to function in a particular manner, such that the instructions stored in the non-transitory computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented to drive one or more central processing units (CPUs) in a device or a secure multimedia card.

Figure 1B:
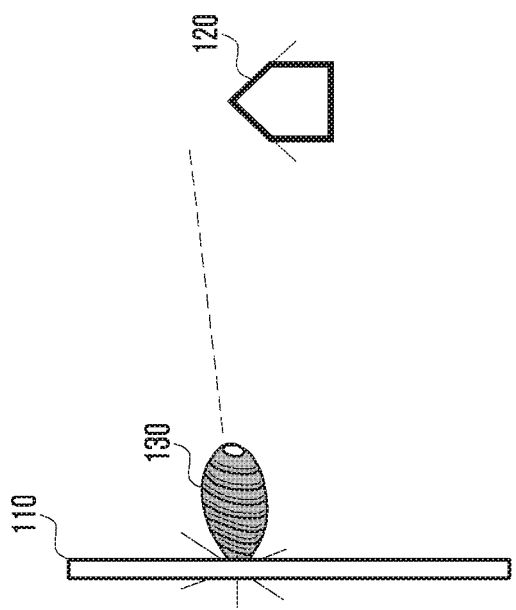

FIGS. 1A and 1B are diagrams illustrating an example of setting an antenna orientation according to an embodiment of the present disclosure.

FIGS. 2A and 2B are diagrams illustrating another example of setting an antenna orientation according to an embodiment of the present disclosure.

Referring to FIG. 1A, a signal 130 may be transmitted from a base station 110 to a terminal 120. The terminal 120 may be a mobile terminal or a fixed wireless access (FWA) terminal having no mobility. In this case, the transmitted signal 130 may be incident on the terminal 120 at a certain angle rather than vertically. Also, although not shown, a signal transmitted from the terminal 120 to the base station 110 may be incident on an antenna of the base station 110 at a certain angle.

However, when the signal 130 transmitted from the base station 110 to the terminal 120 enters an antenna of the terminal 120 in a tilted state, namely, when the transmission signal 130 is received by the antenna of the terminal 120 at an incident angle other than 90 degrees, the gain of the signal 130 received by the terminal 120 may be dropped. For example, if the transmission signal 130 of the base station 110 is incident on the antenna of the terminal 120 directly, i.e., at a right angle, the gain drop of the received signal may be about 0 dB. However, if the transmission signal 130 of the base station 110 is incident on the antenna of the terminal 120 at 0 degree, the gain drop of the received signal at the terminal 120 may be about −8.7705 dB.

Therefore, there is a need for optimization of altering an antenna orientation of the base station 110 so that a transmission signal 135 of the base station 110 is vertically incident on the antenna of the terminal 120 as shown in FIG. 1B (or a transmission signal of the terminal 120 is vertically incident on the antenna of the base station 110). Similarly, although not shown, optimization of altering an antenna orientation of the terminal 120 may be also possible so that the transmission signal 135 of the base station 110 is vertically incident on the antenna of the terminal 120.

In addition, when there are a plurality of terminals 120, 121, 123 and 125 as shown in of FIG. 2A, a signal 140 transmitted from the base station 110 may be incident on each of the terminals 120, 121, 123 and 125 at a certain angle rather than vertically.

If the antenna of the base station 110 is adjusted such that the transmission signal 140 is vertical to only one of the terminals when a plurality of terminals 120, 121, 123 and 125 exist, the transmission signal 140 to the other terminals may still be tilted at a certain angle. Also, according to some embodiments, the gain drop of the received signal may be reduced in case of a terminal on which the transmission signal 140 is vertically incident, whereas the gain drop of the received signal may be rather increased in case of a specific terminal. As a result, the sum of the gain drops of the received signals of the respective terminals 120, 121, 123 and 125 may be increased when the antenna of the base station 110 is adjusted such that the transmission signal 140 is vertical to only one terminal.

In addition, the plurality of terminals 120, 121, 123 and 125 may have different amounts of traffic and different usage requirements (e.g., usage conditions). Therefore, there is a need for optimization of altering the antenna orientation of the base station 110 as shown in of FIG. 2B by considering respective weights of the plurality of terminals 120, 121, 123 and 125. In this case, the antenna orientation of the base station 110 needs to be altered such that gain drop values are optimized when the signal 145 transmitted from the antenna of the base station 110 are received by the respective terminals 120, 121, 123 and 125.

Particularly, in the mobile environment, it is preferred to optimize the antenna orientation of the base station 110 by wholly considering a time, positions of terminals, a change in traffic distribution of each connected user, and the like.

Meanwhile, in case of a base station according to the related art, the antenna is fixedly installed at the beginning. Namely, once installed, the antenna of the base station may not be adjusted in orientation. Therefore, the orientation of the antenna initially installed is important.

Accordingly, a base station according to an embodiment of the present disclosure allows the antenna orientation to be adjusted. In addition, an embodiment of the present disclosure provides a method for dynamically and optimally adjusting the antenna orientation of the base station by wholly considering a time, positions of terminals, a change in traffic distribution of each connected user, quality of service (QoS) requirements, subscriber levels, changes in positions of terminals, variations of channel environment, an additionally installed base station, and the like. Further, an embodiment of the present disclosure provides a method for dynamically and optimally adjusting the antenna orientation of the terminal by wholly considering a time, positions of terminals, a change in traffic distribution of each connected user, QoS requirements, subscriber levels, changes in positions of terminals, variations of channel environment, an additionally installed base station, and the like.

Figure 3:
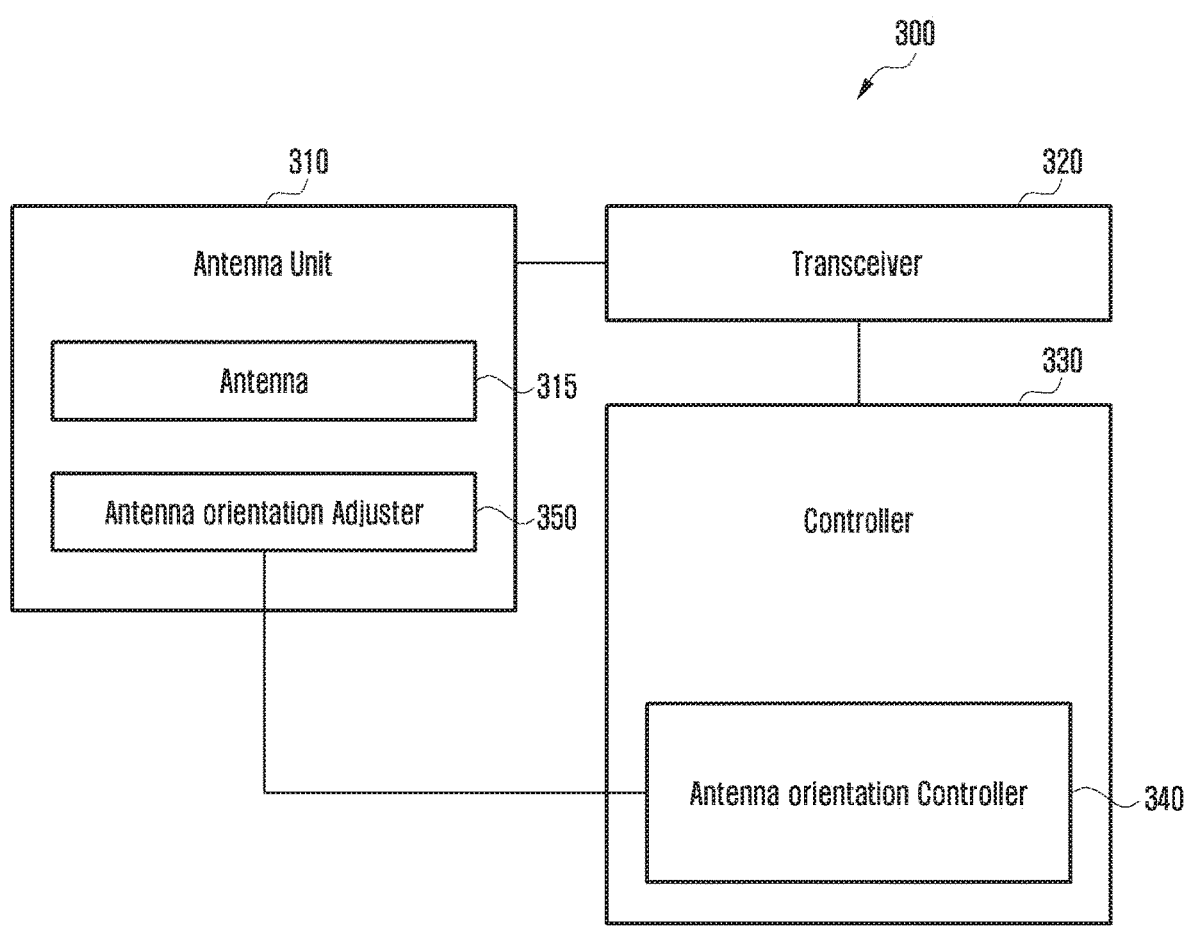
FIG. 3 is a block diagram of a base station according to an embodiment of the present disclosure according to an embodiment of the present disclosure.

FIG. 3 is a block diagram of a base station according to an embodiment of the present disclosure.

Figure 4:
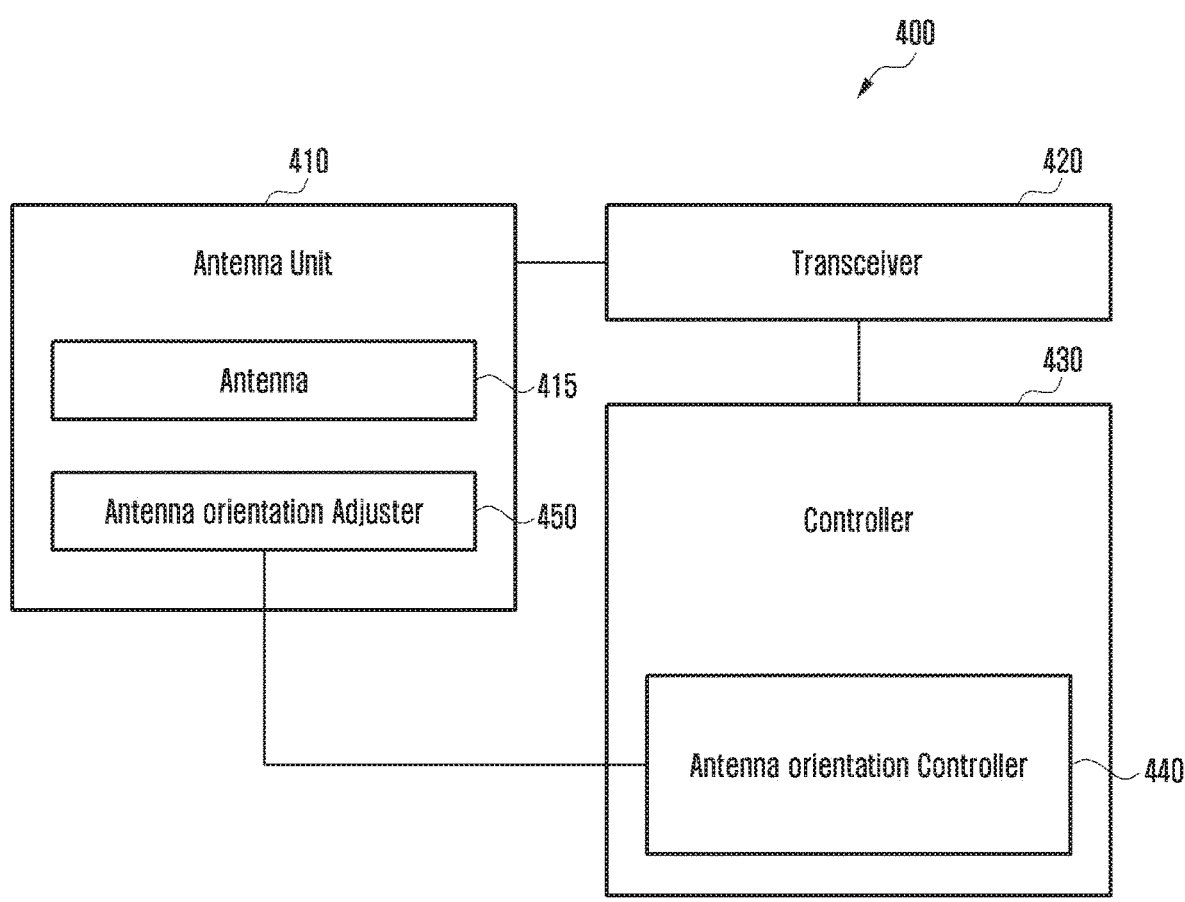
FIG. 4 is a block diagram of a terminal according to an embodiment of the present disclosure according to an embodiment of the present disclosure.

FIG. 4 is a block diagram of a terminal according to an embodiment of the present disclosure.

Referring to FIG. 3, the base station 300 according to an embodiment of the present disclosure may include an antenna unit 310, a transceiver 320, and a controller 330. In addition, the base station 300 may further include an antenna orientation controller 340. Although the antenna orientation controller 340 is shown as being included in the controller 330, this is exemplary only. Alternatively, the antenna orientation controller 340 may exist separately from the controller 330. Also, without the antenna orientation controller 340, the controller 330 may perform an operation of controlling the orientation of an antenna 315 included in the antenna unit 310. For example, the controller 330 may be a particular circuit, an application-specific circuit, or at least one processor. In addition, operations of the base station 300 may be implemented by corresponding program codes stored in a memory device equipped in the base station 300. That is, the controller 330 of the base station 300 may perform the above-described operations by reading and executing the program codes stored in the memory device through a processor or a CPU.

The controller 330 of the base station 300 may control the overall operations of the base station 300. The transceiver 320 of the base station 300 may transmit and receive signals to and from other network entities (e.g., a terminal 400 in FIG. 4) through the antenna unit 310. The antenna orientation controller 340 may perform an operation of controlling the orientation of the antenna 315 included in the antenna unit 310.

The antenna unit 310 may receive signals from other network entities or transmit signals to other network entities. The antenna unit 310 may include the antenna 315, which may be an array antenna in an embodiment. The antenna unit 310 may further include an antenna orientation adjuster 350 for adjusting the orientation of the antenna 315. For this, the antenna orientation adjuster 350 may have a motor (not shown) coupled to the antenna 315.

Meanwhile, as shown in FIG. 4, the terminal 400 according to an embodiment of the present disclosure may include an antenna unit 410, a transceiver 420, and a controller 430.

In addition, the terminal 400 may further include an antenna orientation controller 440. Although the antenna orientation controller 440 is shown as being included in the controller 430. Alternatively, the antenna orientation controller 440 may exist separately from the controller 430. Also, without the antenna orientation controller 440, the controller 430 may perform an operation of controlling the orientation of an antenna 415 included in the antenna unit 410. For example, the controller 430 may be a particular circuit, an application-specific circuit, or at least one processor. In addition, operations of the terminal 400 may be implemented by corresponding program codes stored in a memory device equipped in the terminal 400. That is, the controller 430 of the terminal 400 may perform the above-described operations by reading and executing the program codes stored in the memory device through a processor or a CPU.

The controller 430 of the terminal 400 may control the overall operations of the terminal 400. The transceiver 420 of the terminal 400 may transmit and receive signals to and from other network entities (e.g., the base station 300 in FIG. 3) through the antenna unit 410. The antenna orientation controller 440 may perform an operation of controlling the orientation of the antenna 415 included in the antenna unit 410.

The antenna unit 410 may receive signals from other network entities or transmit signals to other network entities. The antenna unit 410 may include the antenna 415, which may be an array antenna in an embodiment. The antenna unit 410 may further include an antenna orientation adjuster 450 for adjusting the orientation of the antenna 415. For this, the antenna orientation adjuster 450 may have a motor (not shown) coupled to the antenna 415.

Now, operations of respective elements of the terminal 400 and the base station 300 will be described in detail. The controller 430 of the terminal 400 may control the transceiver 420 to transmit a reference signal to the base station 300 through at least one beam based on beam sweeping. The reference signal is used by the base station 300 for calculating a position of the terminal 400 transmitting the reference signal, and/or an angle between the antenna 315 of the base station 300 and the antenna 415 of the terminal 400 transmitting the reference signal. This angle between the antenna 315 of the base station 300 and the antenna 415 of the terminal 400 may be an angle of arrival (AoA), for example. In an embodiment, the reference signal may be a beam refinement reference signal (BRRS).

Additionally, in an embodiment, the controller 330 of the base station 300 may control the transceiver 320 to transmit a reference signal to the terminal 400 through at least one beam based on beam sweeping. Then, the controller 430 of the terminal 400 may transmit a feedback signal for the received reference signal to the base station 300. Also, using the feedback signal, the base station 300 may calculate a position of the terminal 400 transmitting the feedback signal, and/or an angle between the antenna 315 of the base station 300 and the antenna 415 of the terminal 400 transmitting the feedback signal. In an embodiment, this reference signal may also be a BRRS.

Meanwhile, the transmission and reception of the BRRS may be dynamically allocated by downlink resource allocation. Namely, the BRRS is a reference signal that is transmitted by the base station 300 or the terminal 400 if necessary.

If the base station 300 determines that the transmission of the BRRS is required, the base station 300 may allocate a resource to the terminal 400, and thus the terminal 400 may transmit the BRRS to the base station 300. Also, if the terminal 400 determines that the transmission of the BRRS is required, the terminal 400 may request the base station 300 to allocate a resource for BRRS transmission. Then, the base station 300 may allocate a resource to the terminal 400, and thus the terminal 400 may transmit the BRRS to the base station 300.

Alternatively, if the base station 300 determines that the transmission of the BRRS is required, the base station 300 may allocate a resource to the terminal 400, and thus the base station 300 may transmit the BRRS to the terminal 400. Also, if the terminal 400 determines that the transmission of the BRRS is required, the terminal 400 may request the base station 300 to transmit the BRRS, and thus the base station 300 may transmit the BRRS to the terminal 400.

Herein, the BRRS signal ($r_{L,n}(m)$) may be generated according to Equation 1 below.

$$r_{l,n_s}(m) = \frac{1}{\sqrt{2}}(1 - 2c(2m)) + j\frac{1}{\sqrt{2}}, (1 - 2c(2m+1)),$$

$$m = 0, 1, \ldots, \left\lfloor \frac{3}{8}N_{RB}^{max,DL} \right\rfloor - 1$$

Equation 1

In Equation 1, $n_s$ denotes a slot number in a radio frame, and l denotes an OFDM symbol number in a slot. Also, c(n) is a value defined by a pseudo-random sequence.

Meanwhile, a signal transmitted from the antenna 315 of the base station 300 or the antenna 415 of the terminal 400 may be also referred to as a transmission signal, a transmission beam, or the like, and similarly a received signal may be referred to as a reception signal, a reception beam, or the like. For convenience of explanation, an example in which the base station 300 calculates the AoA as an angle between the antenna 315 of the base station 300 and the antenna 415 of the terminal 400 and then, using the AoA, adjusts the orientation of the antenna 315 of the base station 300 or the antenna 415 of the terminal 400 will be described.

The controller 330 of the base station 300 may receive the reference signal transmitted through at least one beam based on beam sweeping from the terminal 400 through the transceiver 320, and may also, using the received reference signal for each beam, calculate the AoA of the terminal 400 that transmits the reference signal. A detailed description will be given later.

In addition, according to an embodiment, the controller 330 of the base station 300 may control the transceiver 320 to transmit the reference signal to at least one terminal 400 through at least one beam based on beam sweeping, and may receive the feedback signal from the terminal 400 that receives the reference signal. Then, using the received feedback signal for each beam, the controller 330 of the base station 300 may calculate the AoA of the terminal 400 that transmits the feedback signal.

In addition, using AoA values calculated for the respective terminals, the controller 330 of the base station 300 or the antenna orientation controller 340 of the base station 300 may calculate the optimal antenna orientation of the antenna 315 of the base station 300. A detailed description will be given later.

Thereafter, based on the calculated optimal antenna orientation, the controller 330 or the antenna orientation controller 340 of the base station 300 may adjust the orientation of the antenna 315. For this, the controller 330 or the antenna orientation controller 340 of the base station 300 may transmit a base station antenna orientation adjusting signal to the antenna orientation adjuster 350. Then, the antenna orientation adjuster 350 that receives the base station antenna orientation adjusting signal may adjust the orientation of the antenna 315 according to the received signal. If the antenna orientation adjuster 350 of the base station 300 has a motor, the antenna orientation controller 340 of the base station 300 may drive the motor to adjust the orientation of the antenna 315 of the base station 300. At this time, both the azimuth and the elevation of the base station antenna 315 may be adjusted by driving the motor.

Meanwhile, according to an embodiment, the controller 330 of the base station 300 may calculate the optimal antenna orientation of the antenna 415 of the terminal 400. Namely, using the reference signals received from the respective terminals 400, the controller 330 of the base station 300 may calculate the AoA for each of the terminals 400. Then, using the calculated AoA values of the terminals 400, the controller 330 of the base station 300 may calculate an antenna orientation adjusting value of each terminal 400. For example, the first terminal and the second terminal may be located within the coverage of the base station 300. In this case, the controller 330 of the base station 300 may receive the first reference signal and the second reference signal from the first terminal and the second terminal, respectively. Then, using the first and second reference signals, the controller 330 of the base station 300 may calculate the first AoA of the first terminal and the second AoA of the second terminal. Thereafter, using the first and second AoAs, the controller 330 of the base station 300 may calculate an antenna orientation adjusting value (e.g., X degrees) of the first terminal and also calculate an antenna orientation adjusting value (e.g., Y degrees) of the second terminal. In addition, the controller 330 of the base station 300 may transmit the antenna orientation adjusting value of the antenna 415 of the terminal 400, calculated for each terminal 400, to that terminal 400.

The terminal 400 may adjust the orientation of the antenna 415 of the terminal 400 by using the antenna orientation adjusting value of the antenna 415 of the terminal 400 received from the base station 300. At this time, using the received antenna orientation adjusting value of the antenna 415 of the terminal 400, the controller 430 or the antenna orientation controller 440 of the terminal 400 may generate a terminal antenna orientation adjusting signal for controlling the antenna orientation adjuster 450 of the terminal 400. Then, the controller 430 or the antenna orientation controller 440 of the terminal 400 may transmit the generated terminal antenna orientation adjusting signal to the antenna orientation adjuster 450 to operate the antenna orientation adjuster 450. If the antenna orientation adjuster 450 of the terminal 400 has a motor, the antenna orientation controller 440 of the terminal 400 may drive the motor to adjust the direction of the antenna 415 of the terminal 400.

Meanwhile, according to an embodiment, the controller 430 or the antenna orientation controller 440 of the terminal 400 may calculate the optimal antenna orientation of the antenna 415 of the terminal 400. For this, the controller 430 of the terminal 400 may receive the AoA value of at least one terminal from the base station 300. Then, using the received AoA value of at least one terminal, the controller 430 or the antenna orientation controller 440 of the terminal 400 may calculate the optimal antenna orientation of the antenna 415. Then, based on the calculated optimal antenna orientation, the terminal 400 may operate the antenna orientation adjuster 450 to adjust the orientation of the antenna 415 of the terminal 400.

According to a certain embodiment, the orientation of the antenna 415 of the terminal 400 may be adjusted when the terminal 400 is a fixed terminal. For example, the terminal 400 may be a stationary electronic device (i.e., household appliance) that exists in a home and uses an internet of thing (IoT). Unlike a mobile terminal, the fixed terminal has a characteristic that the transmission/reception direction of a signal does not change frequently with respect to the base station 300. For example, if the base station 300 is located in the right direction of the terminal 400 which is a fixed type, the terminal 400 may continue to communicate with the base station 300 in the right direction. Therefore, once the orientation of the antenna 415 of the fixed terminal 400 is adjusted, a signal received from the base station 300 by the terminal 400 (or a signal transmitted to the base station 300) may have a small variation.

Hereinafter, specific operations of the base station and the terminal will be described in detail.

Figure 5A:
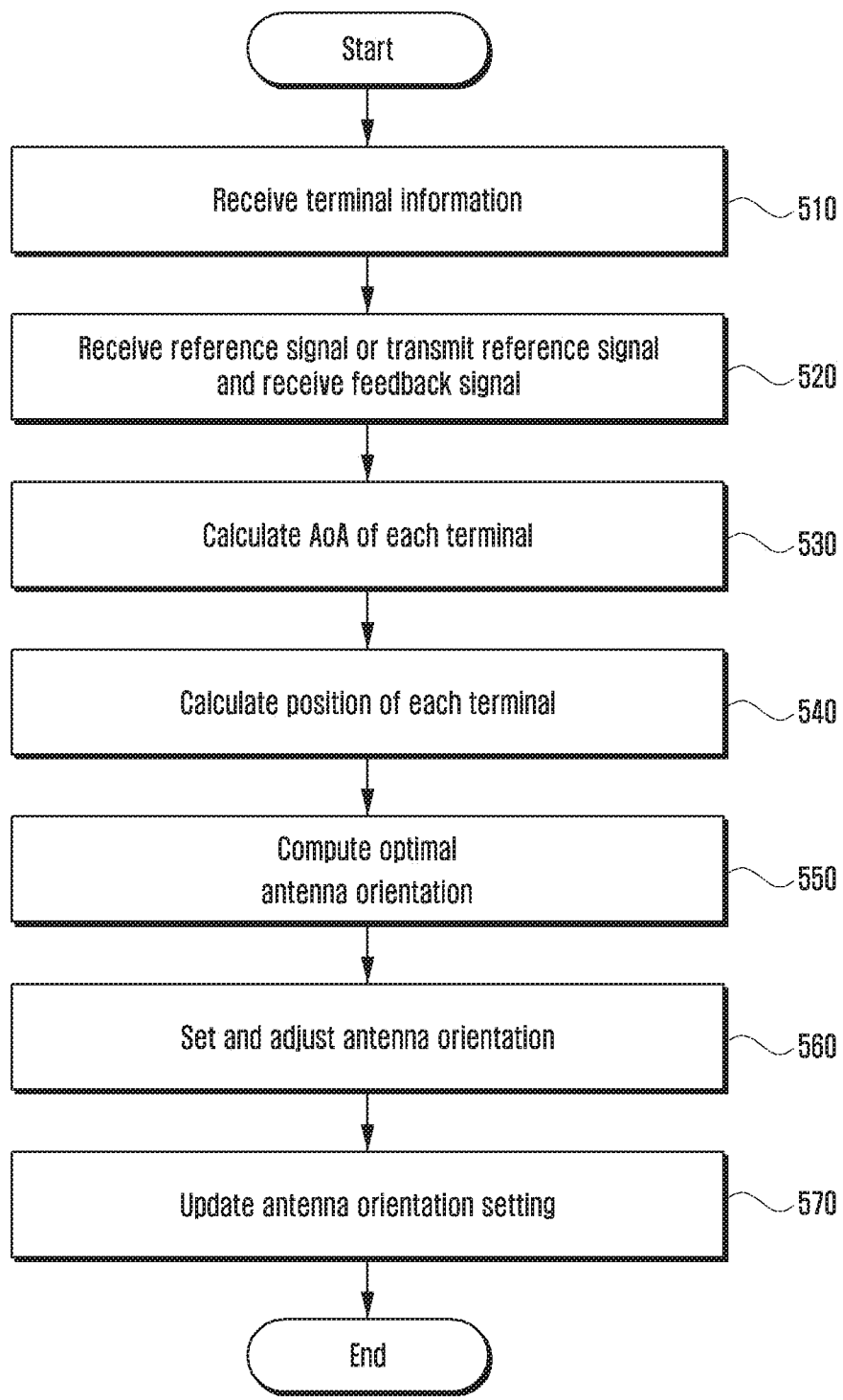
FIGS. 5A and 5B are flow diagrams illustrating an operation of a base station according to an embodiment of the present disclosure.
Figure 5B:
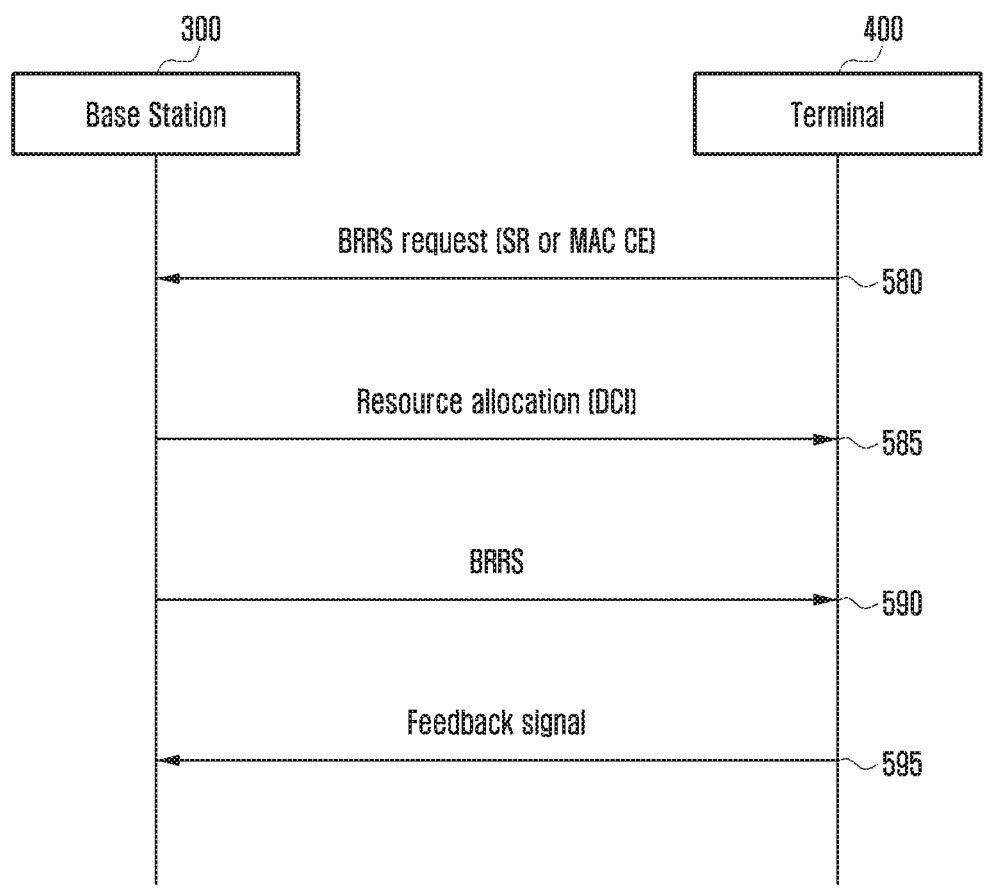

FIGS. 5A and 5B are flow diagrams illustrating an operation of a base station according to an embodiment of the present disclosure.

Figure 6:
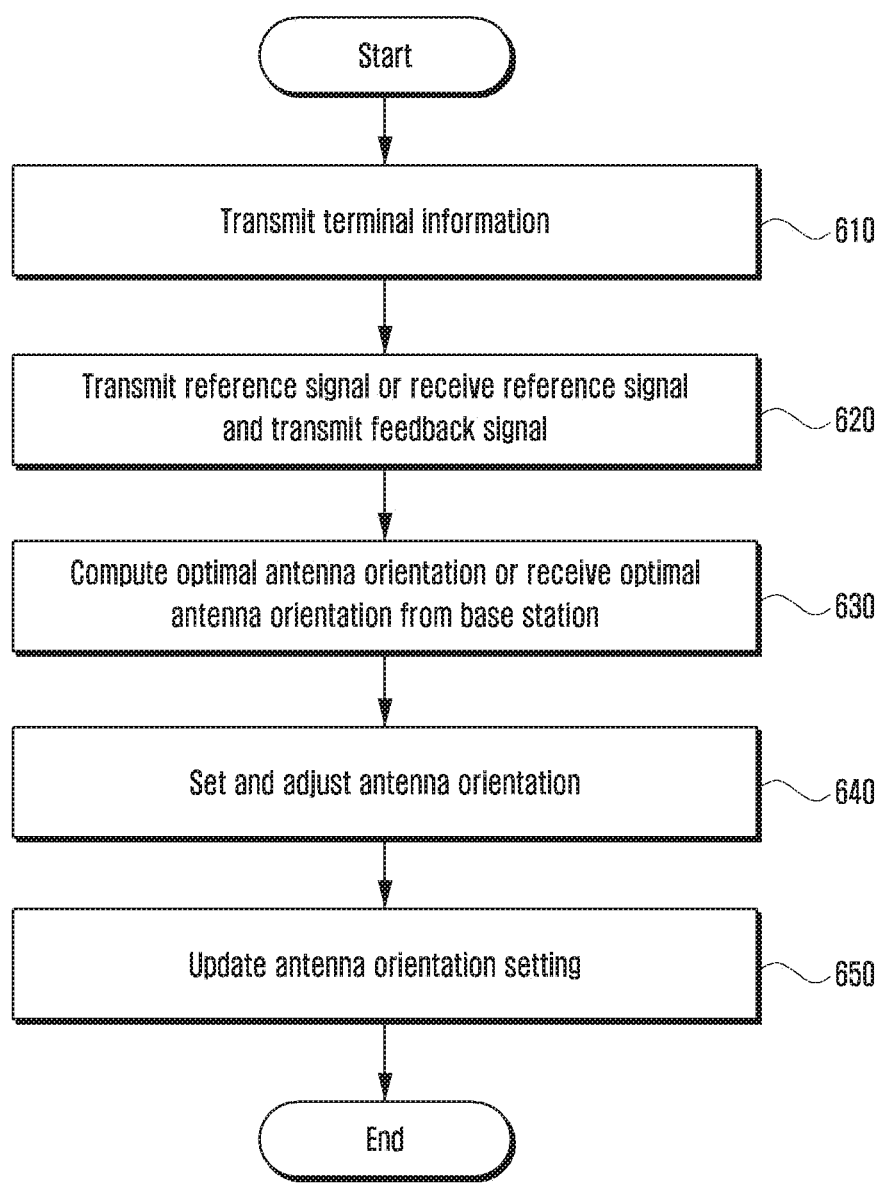
FIG. 6 is a flow diagram illustrating an operation of a terminal according to an embodiment of the present disclosure.

FIG. 6 is a flow diagram illustrating an operation of a terminal according to an embodiment of the present disclosure.

Figure 7:
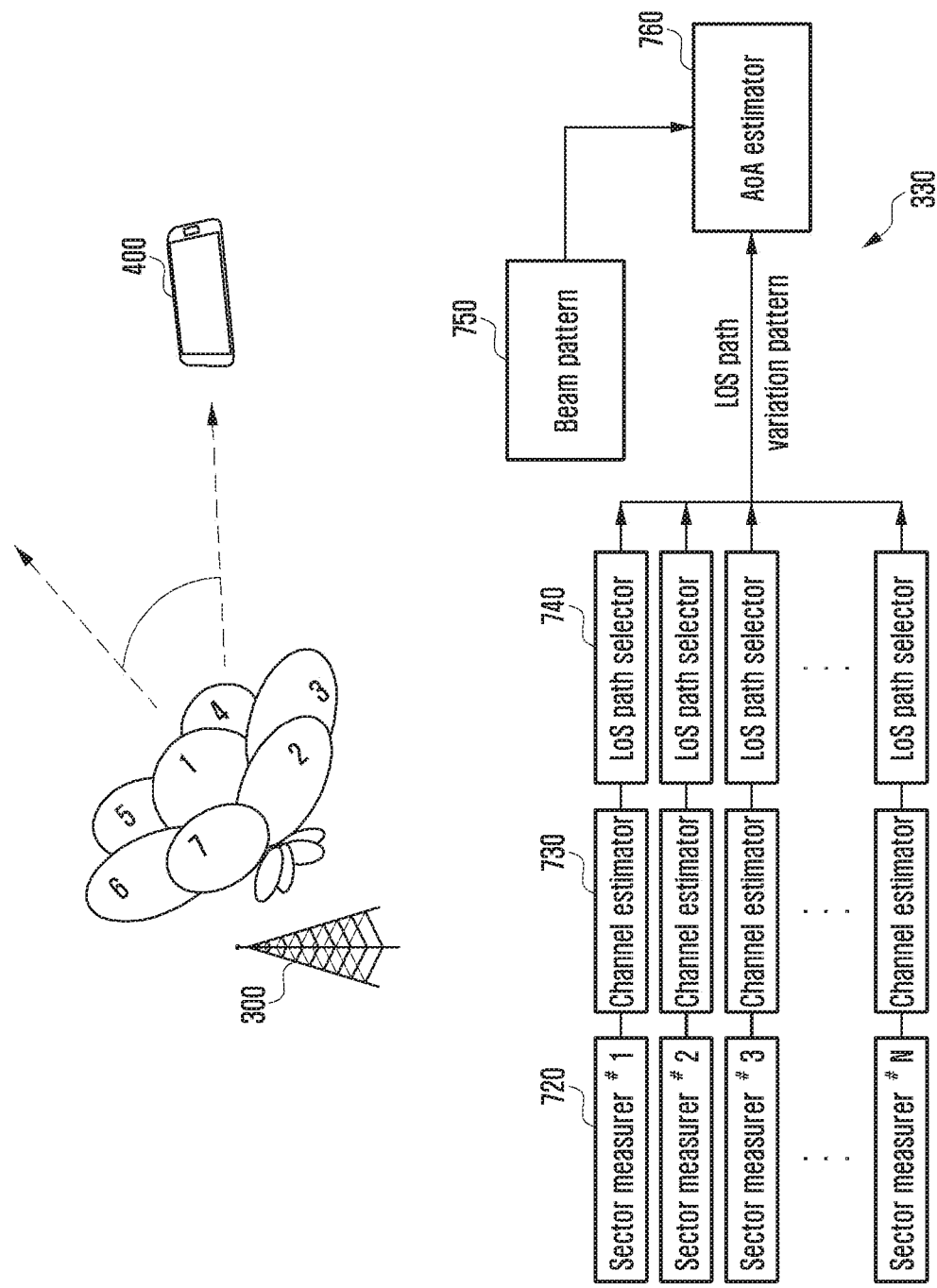
FIGS. 7 and 8 are diagrams illustrating an orientation estimating operation of a terminal according to an embodiment of the present disclosure.
Figure 8:
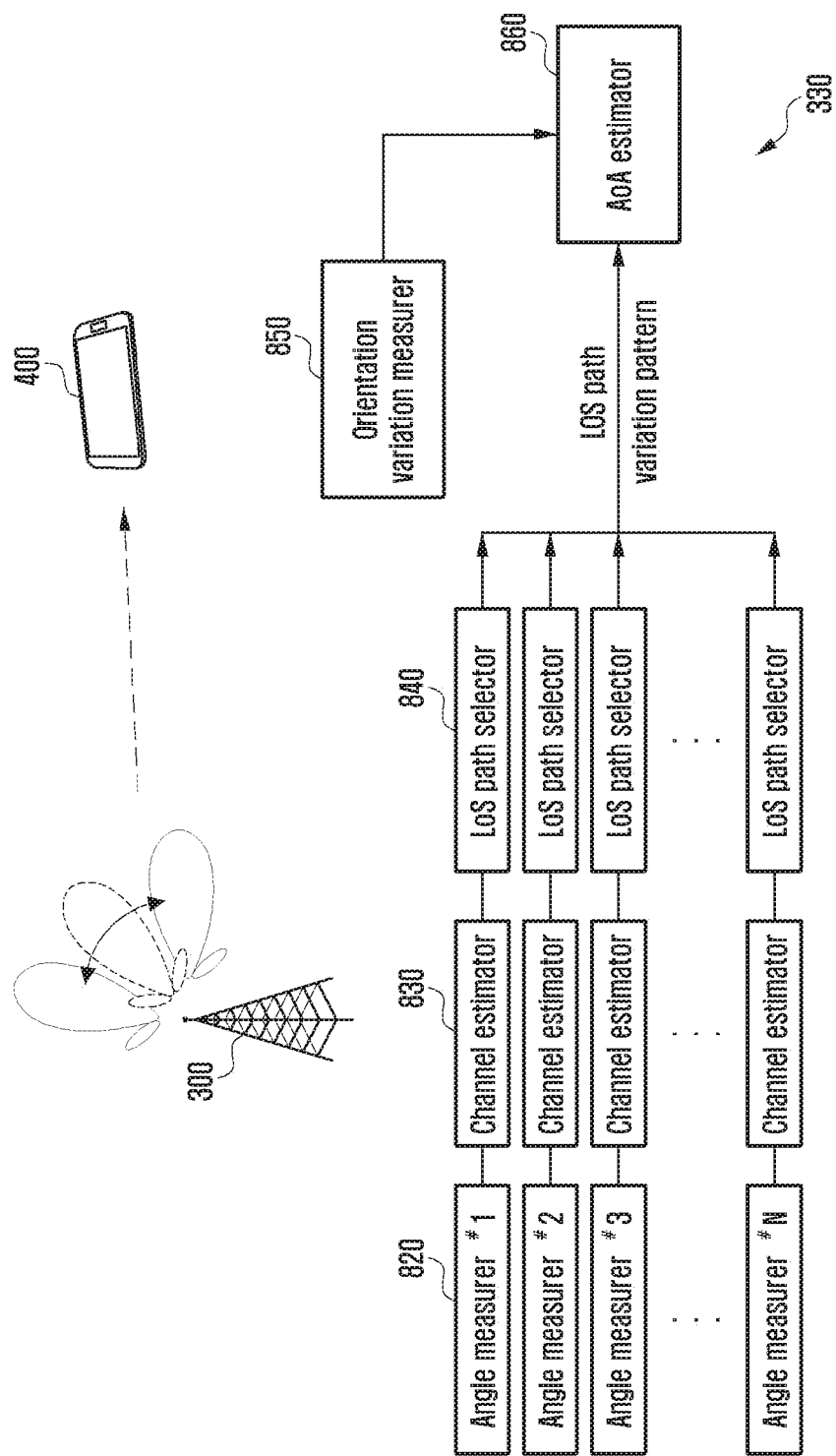

FIGS. 7 and 8 are diagrams illustrating an orientation estimating operation of a terminal according to an embodiment of the present disclosure.

As shown in FIG. 5A, at operation 510, the base station 300 may receive terminal information from at least one terminal 400. This allows the base station 300 to identify the terminals 400 located within its cell coverage. Namely, through the received terminal information, the base station 300 may know the number of the terminals 400 existing in its coverage and/or information about users of the terminals 400. This information about users of the terminals 400 may include, for example, charging information for each user of the terminals 400 (e.g., whether the user of each terminal 400 uses a high charge rate), signal quality information required by each user of the terminals 400 (e.g., whether the user of each terminal 400 requires a high level accuracy, a quality of service (QoS) for each user, etc.), and/or subscriber level information for each user of the terminals 400. Meanwhile, the base station 300 may receive terminal identification information from the terminal 400, transmit to another network entity a message including the terminal identification information and requesting information about the user of the terminal 400, and receive information about the user as a response thereto.

At operation 520, the base station 300 may receive, from at least one terminal 400, a reference signal transmitted through at least one beam based on beam sweeping. As mentioned above, the reference signal is used for calculating a position of the terminal 400 transmitting the reference signal, and/or an angle between the antenna 315 of the base station 300 and the antenna 415 of the terminal 400 transmitting the reference signal. According to an embodiment, the reference signal may be a BRRS.

Alternatively, according to an embodiment, the base station 300 may transmit the reference signal through at least one beam based on beam sweeping to at least one terminal 400 at operation 520. Then, the base station 300 may receive a feedback signal in response to the reference signal from the terminal 400. The feedback signal may include information about received signal strength and the like of the terminal 400 that receives the reference signal.

Details are shown in FIG. 5B. If the base station 300 or the terminal 400 determines that transmission of a reference signal is required, the base station 300 or the terminal 400 may transmit the reference signal.

On the one hand, if the base station 300 determines that the reference signal transmission of the base station 300 is required, the base station 300 may allocate a resource for transmitting the reference signal to the terminal 400 at operation 585. At this time, the resource allocation may be performed through, for example, downlink control information (DCI). Then, at operation 590, the base station 300 may transmit the reference signal to the terminal 400 through at least one beam based on beam sweeping. At this time, the reference signal may be BRRS. Thereafter, the terminal 400 may receive the reference signal and measure the received signal strength of the reference signal. Then, at operation 595, the terminal 400 may transmit the feedback signal including information about the received signal strength of the reference signal to the base station 300.

On the other hand, if the terminal 400 determines that the reference signal transmission of the base station 300 is required, the terminal 400 may request the base station 300 to transmit the reference signal at operation 580. At this time, this request for transmission of the reference signal may be sent through a scheduling request (SR) or a media access control (MAC) control element (CE). Thereafter, at operation 585, the base station 300 may allocate a resource for transmitting the reference signal to the terminal 400 in response to the request of the terminal. Then, as described above, the base station 300 may transmit the reference signal to the terminal 400 through at least one beam based on beam sweeping at operation 590, and also receive the corresponding feedback signal at operation 595.

Although FIG. 5B exemplarily shows a process of transmitting the reference signal by the base station, a process of transmitting the reference signal by the terminal may also be similar.

For example, if the terminal 400 determines that the reference signal transmission of the terminal 400 is required, the terminal 400 may request the base station 300 to allocate a resource for transmission of the reference signal. If the base station 300 allocates accordingly the resource to the terminal 400, the terminal 400 may transmit the reference signal to the base station 300 through at least one beam based on beam sweeping according to the allocated resource.

In addition, if the base station 300 determines that the reference signal transmission of the terminal 400 is required, the base station 300 may request the terminal 400 to transmit the reference signal. Also, the base station 300 may simultaneously or sequentially allocate a resource for transmission of the reference signal to the terminal 400. Accordingly, the terminal 400 may transmit the reference signal to the base station 300 through at least one beam based on beam sweeping according to the allocated resource.

Returning to FIG. 5A, at operation 530, the base station 300 may calculate the AoA for each terminal by using the reference signal or the feedback signal received from the terminal 400 at operation 520.

To calculate the AoA, the base station 300 may use the received signal strength of the reference signal received from the terminal 400. For example, while adjusting the orientation of the antenna 315, the base station 300 may measure the received signal strength of the reference signal at each angle. Then, the base station 300 may estimate, as the AoA of the terminal, a specific angle at which the greatest received signal strength of the reference signal is measured. Namely, the base station 300 may measure the received signal strength of the reference signal for each beam and then, based on a specific beam having the greatest received signal strength of the reference signal, calculate an angle between the terminal 400 and the base station 300.

This will be described in more detail with reference to FIGS. 7 and 8. According to embodiments, the base station 300 may scan the orientation of the terminal 400 by using an electric beam-sweep method as shown in FIG. 7 or using a manual beam-sweep method as shown in FIG. 8. Such an orientation estimating operation may be performed by the controller 330 or the antenna orientation controller 340 of the base station 300.

For the electric beam-sweep method as shown in FIG. 7, the controller 330 (or the antenna orientation controller 340) of the base station 300 may include at least one sector measurer 720, at least one channel estimator 730, at least one line-of-sight (LoS) path selector 740, a beam pattern storage 750, and an AoA estimator 760. The at least one sector measurer 720 measures the strength of a signal received from the terminal 400 while the antenna beam direction is changed through antenna beamforming (i.e., while beam sweeping). If there are a plurality of sector measurers 720, each of the sector measurers 720 may correspond to each of a plurality of channel estimators 730. Each channel estimators 730 may estimate a corresponding channel. If there are the plurality of channel estimators 730, each of the channel estimators 730 may correspond to each of a plurality of LOS path selectors 740. Each LOS path selector 740 may select an LOS path by searching for a peak in the estimated channel. The AoA estimator 760 may compare an LOS path variation pattern outputted from the at least one LOS path selector 740 and a beam pattern previously stored in the beam pattern storage 750 and, based on a comparison result, estimate the AoA. Accordingly, the orientation of the terminal 400 may be estimated.

For the manual beam-sweep method as shown in FIG. 8, the controller 330 (or the antenna orientation controller 340) of the base station 300 may include at least one angle measurer 820, at least one channel estimator 830, at least one LOS path selector 840, an orientation variation measurer 850, and an AoA estimator 860. The at least one angle measurer 820 measures the strength of a signal received from the terminal 400 while the antenna beam direction of the base station 300 is physically changed in a state where the antenna beam is fixed to the front. If there are a plurality of angle measurers 820, each of the angle measurers 820 may correspond to each of a plurality of channel estimators 830. Each channel estimator 830 may estimate a corresponding channel. If there are the plurality of channel estimators 830, each of the channel estimators 830 may correspond to each of a plurality of LOS path selectors 840. Each LOS path selector 840 may select an LOS path by searching for a peak in the estimated channel. The AoA estimator 860 may compare an LOS path variation pattern outputted from the at least one LOS path selector 840 and a beam pattern measured by the orientation variation measurer 850 that may be implemented by a gyroscope sensor, and then estimate the AoA based on a comparison result. Accordingly, the orientation of the terminal 400 may be estimated.

Returning again to FIG. 5A, at operation 530, the base station 300 may calculate the AoA for each terminal 400 by using, for example, the electric beam-sweep method or the manual beam-sweep method as discussed above.

In addition, according to an embodiment, the base station 300 may calculate the position of each terminal 400 at operation 540. For example, using the received signal strength of the reference signal transmitted by the terminal at operation 520, the base station 300 may calculate the position of the terminal 400. The received signal strength of the reference signal transmitted from the terminal 400 near to the base station 300 may be strong, and the received signal strength of the reference signal transmitted from the terminal 400 being far away may be weak. Therefore, the base station 300 may calculate the distance of the terminal 400 according to the received signal, based on a predetermined rule of variations in the received signal strength according to a distance between the base station 300 and the terminal 400. Then, using the AoA information of the terminal calculated at operation 530, the base station 300 may estimate the position of the terminal 400. Namely, the base station 300 may calculate the position of the terminal 400 by using a distance between the base station 300 and the terminal 400 and an angle between the base station 300 and the terminal 400.

Alternatively, according to another embodiment, the base station 300 may calculate the position of the terminal 400 by using the feedback signal received from the terminal 400. For example, in case of the terminal 400 having a short distance from the base station 300, the reference signal received strength of the terminal 400 may be strong. In case of the terminal 400 having a long distance from the base station 300, the reference signal received strength of the terminal 400 may be weak. In addition, information about such reference signal received strength of the terminal 400 may be transmitted to the base station 300 through the feedback signal. Thus, the base station 300 may calculate the distance of the terminal 400 according to the feedback signal, based on a predetermined rule of variations in the received signal strength of the terminal 400 according to a distance between the base station 300 and the terminal 400.

When the terminal 400 includes a positioning module such as a global positioning system (GPS) in a certain embodiment, the terminal 400 may inform the base station 300 about its position so that the base station 300 may know the position of the terminal 400. In this case, the base station 300 may first identify the position of the terminal 400 and then calculate the AoA of the terminal 400 by using the position of the terminal 400. In this case, it may not be necessary to receive the reference signal at operation 520.

Thereafter, at operation 550, the base station 300 may compute the optimal antenna orientation of the base station antenna 315. At this time, the base station 300 may compute the optimal antenna orientation of the base station antenna 315 by considering at least one of the AoA of each terminal 400 existing in the cell coverage of the base station, the position of each terminal 400, the amount of traffic of each terminal 400, information about a user of each terminal 400, QoS requirements of each terminal 400, a subscriber level of each terminal 400, variations of channel environment, or the presence or not of an additional base station. For this, the base station 300 may calculate a total cost about all users (i.e., the terminals 400) with respect to respective angles of the antenna 315. Meanwhile, the information about a user of each terminal 400 may include charging information for each user of the terminals 400 (e.g., whether the user of each terminal 400 uses a high charge rate), signal quality information required by each user of the terminals 400 (e.g., whether the user of each terminal 400 requires a high level accuracy, a QoS for each user, etc.), and/or subscriber level information for each user of the terminals 400.

For example, by considering the AoA of each terminal 400 existing within the cell coverage of the base station 300, the base station 300 may compute the optimal antenna orientation of the base station antenna 315. Namely, when wholly considering the respective AoAs of the terminals 400, the orientation of the base station antenna 315 may be determined so that the loss of a signal received at the terminal 400 is minimized. For example, the first terminal, the second terminal, and the third terminal may exist in the cell coverage of the base station 300. In this case, by considering all of the AOA of the first terminal, the AoA of the second terminal, and the AoA of the third terminal, the base station 300 may calculate the optimal orientation of the base station antenna 315 so that the sum of a gain drop value of a received signal of the first terminal, a gain drop value of a received signal of the second terminal, and a gain drop value of a received signal of the third terminal is minimized. For this, the base station 300 may calculate the sum of gain drop values of the first, second and third terminals with respect to every angle of the antenna 315. Then, the base station 300 may compute the optimal antenna orientation so that the orientation of the antenna 315 of the base station 300 is adjusted to an angle with the smallest sum of the gain drop values of the first, second and third terminals. At this time, the base station 300 may compute the optimal antenna orientation of the base station antenna 315 by using a lookup table based on a beam codebook.

Additionally or alternatively, the base station 300 may compute the optimal antenna orientation of the base station antenna 315 by considering both the AoA and the amount of traffic of each terminal 400 existing in its cell coverage. Namely, the base station 300 may determine the orientation of the base station antenna 315 so that a signal quality is high for the terminal 400 having a large amount of traffic and is relatively low for the terminal 400 having a relatively small amount of traffic.

For this purpose, the base station 300 may compute the optimal antenna orientation of the base station antenna 315 by multiplying the AoA of each terminal and a predetermined weight and also by multiplying the amount of traffic of each terminal and another predetermined weight. For example, the base station 300 may multiply the AoA and the traffic amount with respect to each terminal, add such multiplying results with respect to all terminals, and then compute the optimal antenna orientation to minimize this adding result. Also, the base station 300 may multiply the traffic amount of each terminal by a predetermined weight. For example, the weight may increase as the traffic amount increases, or the weight may decrease as the traffic amount increases. And also, the base station 300 may multiply the traffic amount of each terminal by a given weight, further multiply this product and the AoA of each terminal, add these multiplying results with respect to all terminals, and then determine the optimal antenna orientation to minimize this adding result.

Additionally or alternatively, the base station 300 may compute the optimal antenna orientation of the base station antenna 315 by considering the AoA, the subscriber level, the QoS, etc. of each terminal 400 existing in its cell coverage. Namely, the base station 300 may determine the orientation of the base station antenna 315 so that a signal quality is high for the terminal having a high subscriber level and is relatively low for the terminal having a relatively low subscriber level. Also, the base station 300 may determine the orientation of the base station antenna 315 so that a signal quality is high for the terminal requiring a high quality (i.e., the terminal with a high QoS) and is relatively low for the terminal requiring a relatively low quality (i.e., the terminal with a relatively low QoS).

For this purpose, the base station 300 may compute the optimal antenna orientation of the base station antenna 315 by applying predetermined weights to the AoA of each terminal, indication information of the subscriber level of each terminal, and the QoS of each terminal. For example, the base station 300 may multiply the AoA of each terminal by a weight according to the subscriber level and a weight according to the QoS, add such multiplying results with respect to all terminals, and then compute the optimal antenna orientation to minimize this adding result.

In this case, the weight according to the subscriber level of the terminal having a high subscriber level (e.g., a user using a high charge rate) may be greater than the weight according to the subscriber level of the terminal having a relatively low subscriber level (e.g., a user using a low charge rate). For example, the weights according to the subscriber levels may be sequentially set (e.g., the weight of the terminal having the highest subscriber level is 5, the weight of the terminal having the next level is 4, and the like). Then, the base station 300 may multiply the AoA of each terminal by the weight according to the subscriber level, add such multiplying results with respect to all terminals, and determine the orientation of the antenna 315 of the base station 300 to minimize the adding value.

Similarly, the base station 300 may assign a high weight to the terminal requesting a high quality (i.e., the terminal with a high QoS) and assign a low weight to the terminal requiring a relatively low quality (i.e., the terminal with a low QoS). Then, the base station 300 may multiply the AoA of each terminal by the weight according to the quality required by each terminal, add such multiplying results with respect to all terminals, and determine the orientation of the antenna 315 of the base station 300 to minimize the adding value.

Also, the base station 300 may multiply the AoA of each terminal by both the weight according to the subscriber level and the weight according to the quality required by each terminal, add such multiplying results with respect to all terminals, and determine the orientation of the antenna 315 of the base station 300 to minimize the adding value.

In addition, at operation 560, the base station 300 may set the orientation of the base station antenna 315 according to the optimal antenna orientation determined at operation 550. Then, based on the set orientation, the base station 300 may adjust the orientation of the base station antenna 315.

Thereafter, in an embodiment, the base station 300 may update the orientation of the base station antenna 315 according to the set orientation and store the updated orientation at operation 570. Then, the base station 300 may return to operation 510 to repeat operations shown in FIG. 5A.

Accordingly, the base station 300 may continuously adjust the orientation of the base station antenna 315 by wholly considering variations of channel environment, changes in positions of terminals 400 that exist in the coverage of the base station 300, changes in signal strength due to the presence of an additional base station installed around the base station 300, and the like. As a result, the signal transmission/reception speed and quality between the base station 300 and the terminal 400 may be increased. Namely, as the operations shown in FIG. 5A are repeated, the orientation of the base station antenna 315 may be updated in real time. The orientation of the base station antenna 315 may be updated in real time through the following two approaches.

According to one approach, after updating and storing the orientation of the base station antenna 315 at operation 570 and then after a predetermined time, the base station 300 may return to operation 510 and perform again operations 510 to 570 to reset the orientation of the base station antenna 315. Namely, the base station 300 may periodically set the orientation of the base station antenna 315 every predetermined time (e.g., several milliseconds). For this, although not shown, the base station 300 may determine whether a predetermined time has elapsed after operation 570. If the predetermined time has elapsed, operation 510 may be performed.

According to another approach, when there is a predetermined event after updating and storing the orientation of the base station antenna 315 at operation 570, the base station 300 may return to operation 510 and perform again operations 510 to 570 to reset the orientation of the base station antenna 315. For example, when a channel gain for all the terminals 400 is lowered below the reference value due to variations of environment (e.g., the construction of a new building, a change in roadside trees, or the like), when the number of terminals 400 in the coverage of the base station 300 is changed, when a traffic pattern of the terminals 400 is changed (e.g., when a specific terminal downloads heavy traffic), when the subscriber information of a specific terminal 400 is changed (e.g., when the priority or subscriber level of the terminal 400 is changed), when a set of the terminals 400 (i.e., subscribers) managed by each base station 300 is changed because a new base station is installed, or when any other event occurs, the base station 300 may set the orientation of the base station antenna 315. For this, although not shown, the base station 300 may determine whether a predetermined event occurs after operation 570, and may perform operation 510 if the predetermined event occurs.

For example, after the base station 300 sets the orientation of the base station antenna 315 at operation 560, the position of at least one terminal 400 may be changed. In another example, a new terminal 400 that is not considered for setting the orientation of the base station antenna 315 at operation 560 may newly come into the coverage of the base station 300. In such cases, the base station 300 needs to newly set the orientation of the base station antenna 315 by considering the AoA of the terminals 400 existing in its coverage, the positions of the terminals 400, the QoS requirements, the subscriber levels, the amount of traffic of each terminal 400, and the like. Thus, the base station 300 may return to operation 510 and newly set the orientation of the base station antenna 315 through operations 510 through 570.

In addition, a new second base station may be installed in the vicinity of the base station 300. In this case, the terminal 400 existing in the coverage of the first base station 300 may be located within the coverage of the second base station. Also, the terminal 400 may exist within both the coverage of the first base station 300 and the coverage of the second base station. Thus, when the second base station is newly installed, the traffic and the terminal 400 handled by the first base station 300 may be changed. Also, the number of high-level users to be handled by each of the first base station 300 and the second base station may vary. In such cases, the first base station 300 may newly set the orientation of the base station antenna 315 by considering, for example, the signal strength of the second base station, the location of the second base station, the cell coverage of the second base station, the interference caused by a signal of the second base station, the signal strength between the second base station and the terminal, the position of the terminal 400, the AoA of the terminal 400, the QoS requirements, the subscriber levels, the amount of traffic of each terminal 400, and the like.

For example, the second base station may be newly installed in the vicinity of the first terminal 400 which is distant from the first base station 300. In this case, the first terminal 400 may transmit and receive a signal to and from the second base station, so that the first base station 300 may set the orientation of the base station antenna 315 by excluding the first terminal 400. For this, the first base station 300 may calculate a first distance (d1) between the first terminal 400 and the first base station 300. Also, the first base station 300 may receive, from the first terminal 400 or the second base station, information about a second distance (d2) between the second base station and the first terminal 400. In this case, if the first distance (d1) between the first base station 300 and the first terminal 400 is shorter than the second distance (d2) between the second base station and the first terminal 400 (namely, d1<d2), the first base station 300 may set the orientation of the base station antenna 315 by considering the first terminal 400. However, if the first distance (d1) is not shorter than the second distance (d2) (namely, d1>d2), the first base station 300 may set the orientation of the base station antenna 315 without considering the first terminal 400. In another embodiment, if the first distance (d1) between the first base station 300 and the first terminal 400 is smaller than a predetermined first threshold (namely, d1<dth1), the first base station 300 may set the orientation of the base station antenna 315 by considering the first terminal 400. For example, if the first distance (d1) is smaller than 5 km (dth1), the first base station 300 may set the orientation of the base station antenna 315 by considering the first terminal 400. In still another embodiment, if a difference (d1−d2) between the first distance (d1) and the second distance (d2) is smaller than a predetermined second threshold (namely, d1−d2<dth2), the first base station 300 may set the orientation of the base station antenna 315 by considering the first terminal 400. For example, the second threshold (dth2) may be 2 km. In this case, if the first distance (d1) between the first base station 300 and the first terminal 400 is 5 km, and if the second distance (d2) between the second base station and the first terminal 400 is 4 km, the first base station 300 may set the orientation of the base station antenna 315 by considering the first terminal 400 because the difference (d1−d2) between the first distance (d1) and the second distance (d2) is 1 km and smaller than the second threshold (dth2).

According to a certain embodiment, in case of complying with the orientation of the base station antenna 315 determined at operation 560, the first base station 300 may calculate a signal gain drop value of each terminal 400 existing within the coverage of the first base station 300. Then, the first base station 300 may select the terminals 400 whose signal gain drop value is greater than a predetermined third threshold (dth3), and may transmit information about the selected terminals 400 to the second base station. In this case, the second base station may set the orientation of its base station antenna by considering the selected terminals 400 having a signal gain drop value greater than the predetermined third threshold (dth3) as well as considering the terminals 400 existing in its own cell coverage. Similarly, the second base station that complies with the orientation of its base station antenna may calculate a signal gain drop value of each terminal 400 existing within its own coverage. Thereafter, the second base station may select the terminals 400 whose signal gain drop value is greater than a predetermined fourth threshold (dth4), and may transmit information about the selected terminals 400 to the first base station 300. Then, the first base station may set the orientation of its base station antenna 315 by considering the selected terminals 400 having a signal gain drop value greater than the predetermined fourth threshold (dth4) as well as considering the terminals 400 existing in its own cell coverage.

Now, the operation of the terminal 400 will be described with reference to FIG. 6. At operation 610, the terminal 400 may transmit its terminal information to the base station 300. The terminal information may include information about a terminal user, for example, charging information for each user of the terminals 400 (e.g., whether the user of each terminal 400 uses a high charge rate), signal quality information required by each user of the terminals 400 (e.g., whether the user of each terminal 400 requires a high level accuracy, a QoS for each user, etc.), and/or subscriber level information for each user of the terminals 400. Also, the terminal 400 may transmit terminal identification information to the base station 300. Then, the base station 300 may transmit the terminal identification information to another network entity and receive user information of the terminal as a response thereto.

At operation 620, the terminal 400 may transmit a reference signal to the base station 300 through at least one beam based on beam sweeping. As mentioned above, the reference signal is used for calculating a position of the terminal 400 transmitting the reference signal, and/or an angle between the antenna 315 of the base station 300 and the antenna 415 of the terminal 400 transmitting the reference signal.

Alternatively, according to an embodiment, the terminal 400 may receive the reference signal through at least one beam based on beam sweeping from the base station 300 at operation 620. Then, the terminal 400 may measure the received signal strength of the reference signal and transmit, to the base station 300, a feedback signal including information about the received signal strength of the reference signal.

This is described above with reference to FIGS. 5A and 5B, and a detailed description thereof will be omitted.

Meanwhile, according to an embodiment, the terminal 400 may improve the quality of a signal received from the base station 300 by adjusting the antenna 415 thereof.

For this, at operation 630, the terminal 400 may receive, from the base station 300, information for computing the optimal antenna orientation of the terminal antenna 415. Then, at operation 640, the terminal 400 may set the optimal antenna orientation of the terminal antenna 415 by using the received information and also adjust the orientation of the antenna 415.

Specifically, at operation 630, the terminal 400 may receive information about the optimal antenna orientation of the terminal antenna 415 from the base station 300. For this, the base station 300 may calculate the AoAs of the respective terminals 400 by using the reference signals received from the terminals 400. Then, the controller 330 of the base station 300 may calculate an orientation adjusting value of the terminal antenna 415 of each terminal 400 by using the calculated AoA values of the terminals 400. Namely, the base station 300 may calculate the orientation of the terminal antenna 415 through which the terminal 400 can receive the optimal signal according to the orientation of the base station antenna 315. Then, the base station 300 may transmit information about the calculated optimal antenna orientation of the terminal antenna 415 to the terminal 400.

In this case, according to an embodiment, the base station 300 may determine the optimal antenna orientation of the base station antenna 315 and then calculate the optimal antenna orientation of the terminal antenna 415 as described above with reference to FIGS. 5A and 5B. Namely, when there are a plurality of terminals 400 in the coverage of the base station 300, the signal quality of the terminals 400 may be improved by adjusting the orientation of the individual terminal antenna 415 of the terminals 400 in addition to adjusting the orientation of the base station antenna 315. For example, when the base station 300 calculates the optimal antenna orientation of the base station antenna 315 and then transmits or receives a signal in accordance with the calculated optimal antenna orientation, the base station 300 may calculate the optimal antenna orientation of the terminal antenna 415 according to a beam path of the adjusted base station antenna 315. Namely, the optimal antenna orientation of the terminal antenna 415 may be determined by finding a specific angle of the adjusted antenna orientation that causes the smallest signal gain drop.

Meanwhile, according to an embodiment, the terminal 400 may compute the optimal antenna orientation of the terminal antenna 415 at operation 630. For this, the terminal 400 may receive its own AoA value from the base station 300. Then, using the received AoA value, the terminal 400 may compute the optimal antenna orientation of the terminal antenna. Alternatively, the terminal 400 may receive information about the orientation of the base station antenna 315 from the base station 300. Then, considering the orientation of the base station antenna 315, the terminal 400 may compute the optimal antenna orientation of the terminal antenna 415 with the smallest gain drop of transmitted or received signal of the terminal.

At operation 640, the terminal 400 may set the orientation of the terminal antenna 415, based on the optimal antenna orientation of the terminal antenna 415 determined at operation 630 or the optimal antenna orientation of the terminal antenna 415 received from the base station 300. Then, the terminal 400 may adjust the orientation of the terminal antenna 415 according to the set orientation of the terminal antenna 415.

Thereafter, according to an embodiment, the terminal 400 may update the orientation of the terminal antenna 415 according to the set orientation and store the updated orientation at operation 650. Then, the terminal 400 may return to operation 610 to repeat operations shown in FIG. 6.

Accordingly, the base statin 300 may continuously adjust the orientation of the terminal antenna 315 by wholly considering variations of channel environment, changes in positions of terminals 400 that exist in the coverage of the base station 300, changes in signal strength due to the presence of an additional base station installed around the base station 300, and the like. As a result, the signal transmission/reception speed and quality between the base station 300 and the terminal 400 may be increased. Detailed operations are similar to those of the base station discussed above with reference to FIGS. 5A and 5B, so that a detailed description thereof will be omitted.

For example, after a predetermined time, the terminal 400 may return to operation 610 and perform operations of updating the orientation of the terminal antenna 415. Alternatively, when a predetermined event occurs, the terminal 400 may return to operation 610 to update the orientation of the terminal antenna 415.

Meanwhile, various components, modules, etc. of the entity, base station or terminal described herein may be implemented as a hardware circuit such as a complementary metal oxide semiconductor (CMOS) based logical circuit, a firmware, a software embedded in a machine-readable medium, and/or any combination thereof. In one example, various electrical structures and related methods may be implemented using electrical circuits such as transistors, logic gates, and application-specific integrated circuits (ASICs).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A communication method of a base station, the method comprising:
   receiving each reference signal transmitted from a plurality of terminals through at least one beam based on beam sweeping, wherein a physical orientation of a base station antenna of the base station is changed by a motor coupled to the base station antenna and a direction of beam of the base station antenna is physically changed in a state where the beam fixed to front in the beam sweeping;
   identifying each angle between the base station and each of the plurality of terminals based on the each reference signal for each of the at least one beam;
   determining an antenna orientation of a base station antenna of the base station based on at least one of the each angle, each traffic amount of the plurality of terminals or a subscriber level of each user of the plurality of terminals; and
   adjusting a physical orientation of the base station antenna using the motor according to the antenna orientation of the base station antenna,
   wherein a direction of beam of the base station antenna is physically changed in a state where the beam fixed to the front.

2. The method of claim 1, wherein the identifying of the each angle includes:
   measuring received signal strength of the each reference signal for each of the at least one beam; and
   identifying the each angle between the at least one terminal and the base station according to a beam having a greatest received signal strength of the each reference signal.

3. The method of claim 1, wherein the identifying of the each angle includes:
   measuring strength of the each reference signal for each of the at least one beam;
   estimating a channel of each of the at least one beam according to the strength of the each reference signal for each of the at least one beam;
   detecting a peak position in the estimated channel;
   determining a line-of-sight (LoS) path from the peak position; and
   identifying the each angle between the at least one terminal and the base station by using the LoS path and a beam pattern.

4. The method of claim 1, wherein the antenna orientation of the base station antenna is determined to maximize signal strength of the each reference signal of the at least one terminal.

5. The method of claim 4,
   wherein the antenna orientation of the base station antenna is determined based on the each angle between the plurality of terminals and the base station, each position of the plurality of terminals, or information about each user of the plurality of terminals, and
   wherein the information about the each user of the plurality of terminals includes charging information for each user of the plurality of terminals, or information about a signal quality required by each user of the plurality of terminals.

6. The method of claim 1, wherein the determining of the antenna orientation of a base station antenna includes:
   identifying each position of the plurality of terminals transmitting the each reference signal based on-a each strength of the each reference signal; and
   determining the antenna orientation of the base station antenna based on the each angle between the plurality of terminals and the base station and using position information of the each of the plurality of terminals.

7. The method of claim 1, wherein, when there is an additional base station, the antenna orientation of the base station antenna is determined based on information of the additional base station, the each angle between the plurality of terminals and the base station, and information about each position of the plurality of terminals.

8. A base station comprising:
   at least one base station antenna;
   a transceiver configured to transmit and receive a signal; and
   a controller configured to:
      receive each reference signal transmitted from a plurality of terminals through at least one beam based on beam sweeping, wherein a physical orientation of a base station antenna of the base station is changed by a motor coupled to the base station antenna and a direction of beam of the base station antenna is physically changed in a state where the beam fixed to front in the beam sweeping,
      identify each angle between the base station and each the plurality of terminals based on the each reference signal for each of the at least one beam,
      determine an antenna orientation of a base station antenna of the base station based on at least one of the each angle, each traffic amount of the plurality of terminals or a subscriber level of each user of the plurality of terminals, and
      adjust a physical orientation of the base station antenna using the motor according to the antenna orientation of the base station antenna,
   wherein a direction of beam of the base station antenna is physically changed in a state where the beam fixed to the front.

9. The base station of claim 8, wherein the controller is further configured to:
   measure received signal strength of the each reference signal for each of the at least one beam, and
   identify each angle between the plurality of terminals and the base station according to a beam having a greatest received signal strength of the each reference signal.

10. The base station of claim 8, wherein the controller is further configured to:
    measure strength of the each reference signal for each of the at least one beam, to estimate a channel of each beam according to the strength of the each reference signal for each of the at least one beam,
    detect a peak position in the estimated channel,
    determine a line-of-sight (LoS) path from the peak position, and
    identify each angle between the plurality of terminals and the base station by using the LoS path and a beam pattern.

11. The base station of claim 8, wherein the antenna orientation of the base station antenna is determined to maximize signal strength of the each reference signal of the plurality of terminals.

12. The base station of claim 11,
wherein the controller is further configured to determine the antenna orientation of the base station antenna based on at least one of the each angle between the plurality of terminals and the base station, each position of the plurality of terminals, or information about each user of the plurality of terminals, and
wherein the information about each user of the plurality of terminals includes at least one of charging information for each user of the plurality of terminals, or information about a signal quality required by each user of the plurality of terminals.

13. The base station of claim 8, wherein the controller is further configured to:
identify each position of the plurality of terminals transmitting the each reference signal based on a strength of the each reference signal, and
determine the antenna orientation of the base station antenna based on the each angle between the plurality of terminals and the base station and using position information of each of the plurality of terminals.

14. The base station of claim 8, wherein, when there is an additional base station, the controller is further configured to determine the antenna orientation of the base station antenna based on information of the additional base station, the each angle between the plurality of terminals and the base station, and information about each position of the plurality of terminals.

15. A communication method of a terminal, the method comprising:
transmitting a reference signal to a base station through at least one beam based on beam sweeping;
receiving, from the base station, information for adjusting to an antenna orientation of a terminal antenna of the terminal in response to the reference signal for each of the at least one beam; and
adjusting a physical orientation of the terminal antenna to the antenna orientation based on the received information using a motor coupled to the terminal antenna.

16. The method of claim 15, wherein the antenna orientation of the terminal is determined to maximize signal strength of the reference signal of the terminal.

17. The method of claim 15, wherein the receiving of the information for adjusting to the antenna orientation of the terminal antenna includes:
receiving at least one of first information about the antenna orientation of the terminal antenna from the base station or second information on an angle between the terminal and the base station from the base station; and
determining the antenna orientation of the terminal antenna based on the at least one of the first information or the second information.

18. A terminal comprising:
at least one terminal antenna;
a transceiver configured to transmit and receive a signal; and
a controller configured to:
transmit a reference signal to a base station through at least one beam based on beam sweeping,
receive, from the base station, information for adjusting to an antenna orientation of a terminal antenna of the terminal in response to the reference signal for each of the at least one beam, and
adjust a physical orientation of the terminal antenna to the antenna orientation based on the received information using a motor coupled to the terminal antenna.

19. The terminal of claim 18, wherein the antenna orientation of the terminal is determined to maximize signal strength of the reference signal of the terminal.

20. The terminal of claim 18, wherein the controller is further configured to:
receive at least one of first information about the antenna orientation of the terminal antenna from the base station or second information on an angle between the terminal and the base station from the base station, and
determine the antenna orientation of the terminal antenna based on the at least one of the first information or the second information.

* * * * *